June 15, 1965 J. HENRY-BAUDOT 3,189,808
SYNCHRONOUS ELECTRIC ROTARY MACHINE SYSTEM
Filed March 10, 1961 4 Sheets-Sheet 1

June 15, 1965     J. HENRY-BAUDOT     3,189,808
SYNCHRONOUS ELECTRIC ROTARY MACHINE SYSTEM
Filed March 10, 1961     4 Sheets-Sheet 2

June 15, 1965   J. HENRY-BAUDOT   3,189,808
SYNCHRONOUS ELECTRIC ROTARY MACHINE SYSTEM
Filed March 10, 1961   4 Sheets-Sheet 3

June 15, 1965   J. HENRY-BAUDOT   3,189,808
SYNCHRONOUS ELECTRIC ROTARY MACHINE SYSTEM
Filed March 10, 1961   4 Sheets-Sheet 4

United States Patent Office 3,189,808
Patented June 15, 1965

3,189,808
SYNCHRONOUS ELECTRIC ROTARY MACHINE SYSTEM
Jacques Henry-Baudot, Antony, France, assignor to Printed Motors Inc., New York, N.Y.
Filed Mar. 10, 1961, Ser. No. 94,827
Claims priority, application France, Mar. 17, 1960, 821,850, Patent 1,259,582; Feb. 11, 1961, 852,595, Patent 79,219
11 Claims. (Cl. 318—138)

The present invention concerns improvements in the systems of synchronous electric rotary machines and one object thereof is to provide such a system which avoids the usual starting difficulties and the usual risks of oscillation and loss of synchronism in the neighbourhood of the synchronous rotary condition.

A further object of the invention is to provide such a system which is specially suitable for high speeds of rotation, for instance of the order of 10,000 rotations per minute, and for powers reaching several kilowatts, with however a reduced consumption of power and energy, the magnetizing energy being mainly supplied by the very structure of the rotary machine itself in a system according to the invention.

At such speeds and powers, it is highly desirable to reduce at the best, if not cancel, the radial and axial components of magnetic attraction, and consequently, another object of the invention is to provide such a system with recourse to axial airgap electric rotary machines wherein the radial component is intrinsically nil and the axial component may be eliminated by providing a symmetrical arrangement of the inductor structure with respect to the armature part of the machine.

Further, for such speeds and powers, the axial airgap must remain as narrow as possible in order to obtain a fair electromagnetic efficiency. The best conditions in this respect are those presented by machines having printed-circuit winding armatures (printed-circuit comprising flat conductors intimately bound to an insulating carrier, whatever process of manufacturing is used for such a result). A further object of the invention is to provide such a device which takes advantage of such printed-circuit winding machines.

Further also, at such speeds it is desirable not to use brushes or sliders for the electrical current translation. Another object of the invention is, in this respect, to so provide such a system which does not make use of brushes nor sliders. In other words, the present invention does not use a rotary commutator with cooperating brush or sliders.

According to the invention, a system of rotary synchronous electric machine is mainly characterized in that it comprises a rotary unit including a synchronous motor and a tachometer generator, said members having the same number of electrical phases, a plurality of unidirectionally conducting control electrode devices, each device also comprising a cathode and an anode, with a D.C. potential difference applied between said anodes and cathodes, a first plurality of electrical connections between the phases of said tachometer generator and the said control electrodes and a second plurality of connections between the said andoes and the said phases of said motor.

According to another feature of the invention, both the motor and tachometer generator are of the axial airgap kind with fixed armatures and rotary inductors of the permanent magnetic pole kind.

According to a further feature of the invention, both the motor and tachometer armature windings are made of "printed-circuit" windings affixed at their outer edges to a fixed support, either together within an axial airgap delineated by two rotatable ring inductors, or separately with the said inductor rings as a rotatable unit located therebetween.

According to a further feature of the invention, one at least of said windings, or preferably both of them, are provided in star-connection, which enables the omission of either or both transformers between the current translating taps of said windings and the unidirectionally conducting device electrodes.

These and further features will be fully explained with reference to the accompanying drawings, wherein:

FIG. 1 shows a complete diagram of a system according to the invention with respect to an illustrative embodiment of a bipolar tri-hexaphased structure of the motor and tachometer generator, the windings of which are not otherwise disclosed than by two circles and their respective output and input taps;

FIGS. 2 and 3 respectively show partial alternatives of the diagram of FIG. 1, for a star-connected motor winding, FIG. 2, and a star-connected tachometer winding, FIG. 3;

Figure 4:
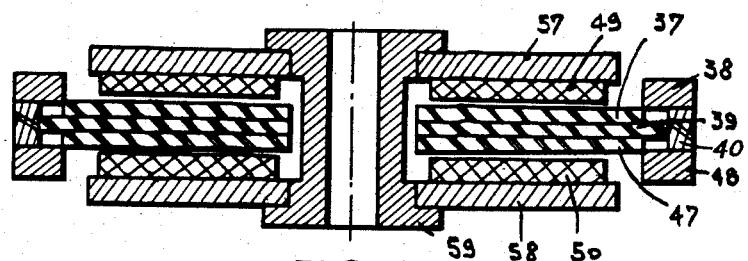
FIG. 4 shows a cross-section elevation view of an example of embodiment of an axial airgap machine for a system according to the invention.
Figure 7:
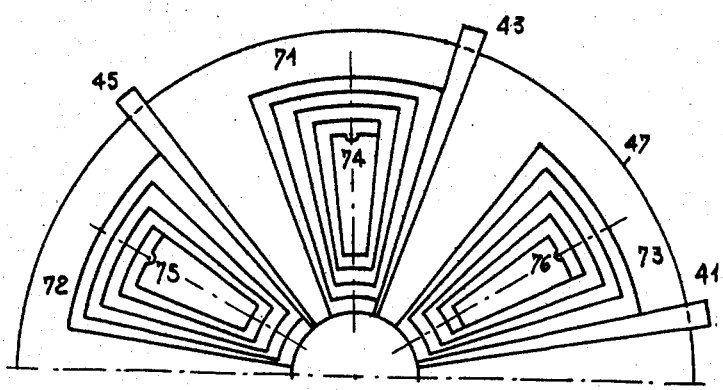
Figure 8:
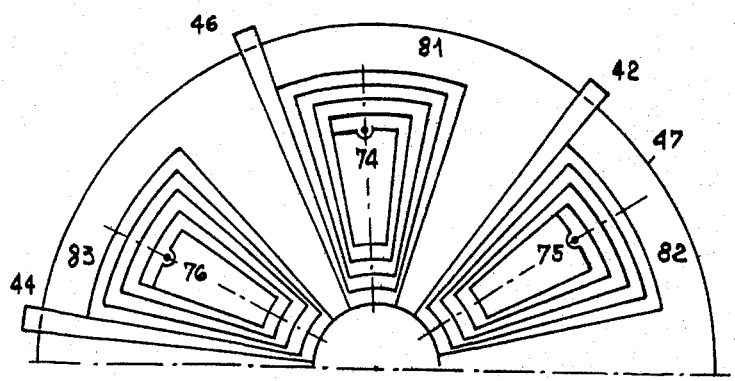
Figure 9:
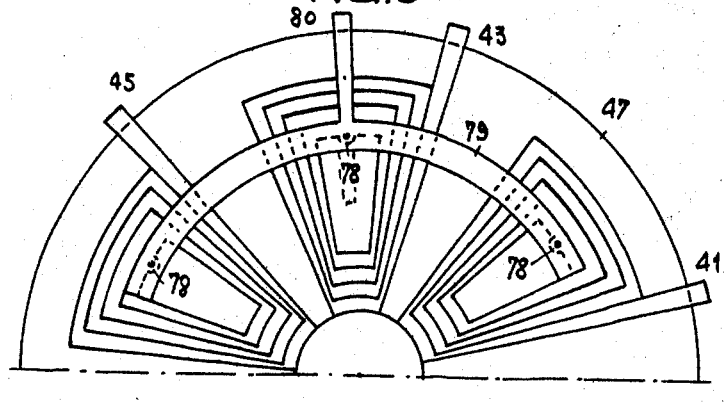
Figure 10:
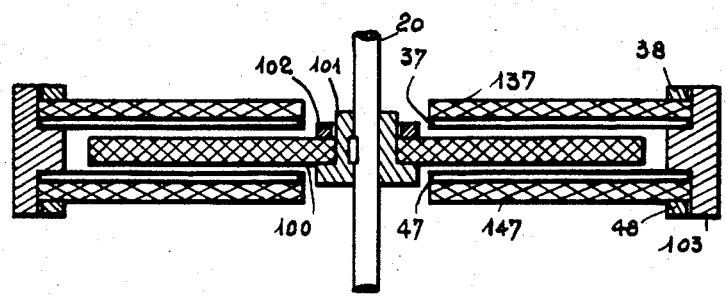

FIGS. 7 and 8 respectively are partial views of the two sides of the upper half of a tachometer winding unit in a machine according to the invention;

FIG. 9 shows a modification of FIG. 7 for a star-connection of such a tachometer winding; and FIG. 10 shows an alternative embodiment of FIG. 4.

From these illustrative embodiments may easily be derived other embodiments according to the technological variations most of them will be defined hereinafter.

Figure 1:
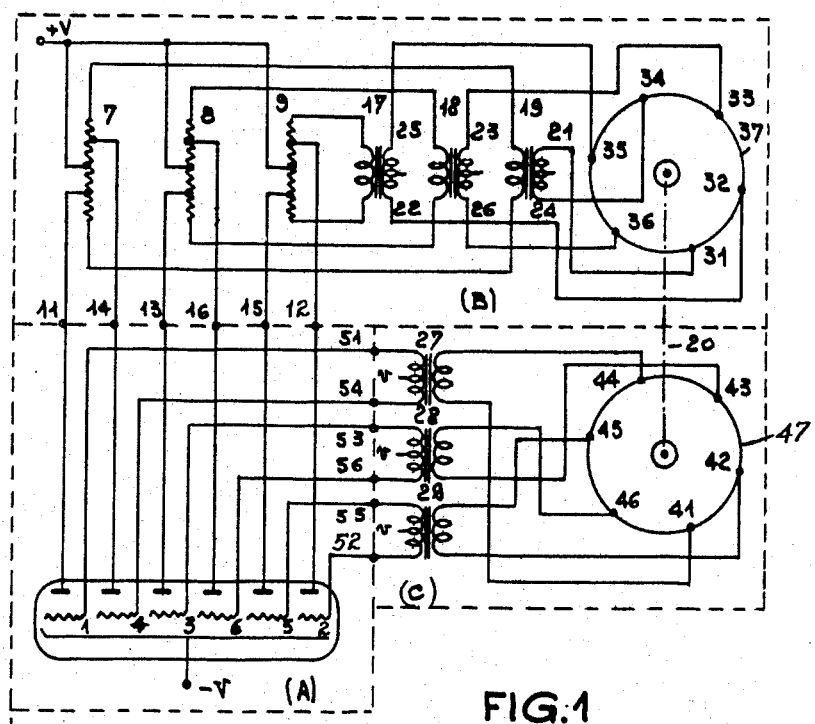
Figures 2, 3:
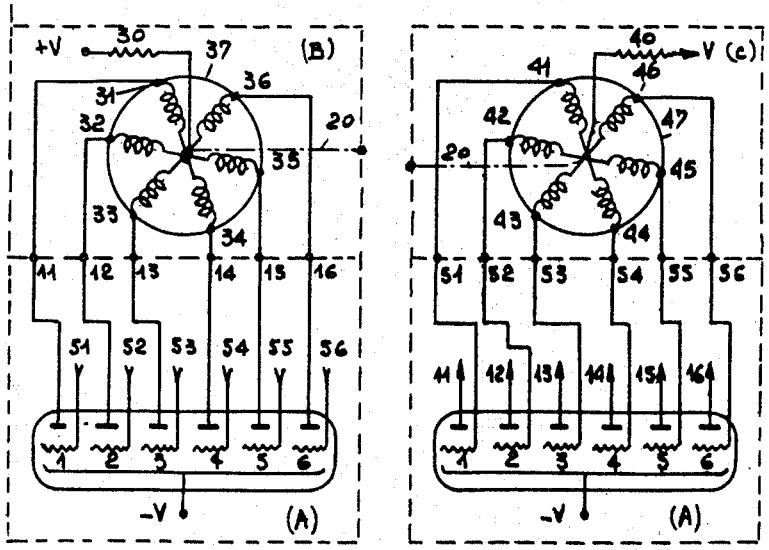

An synchronous rotary machine system according to the invention actually comprises three operatively interconnected parts, as shown in the dotted rectangles A, B and C in the diagram of FIG. 1, and in the partial alternatives of FIGS. 2 and 3. The part A comprises a group of unidirectionally conducting devices the number of which is equal to the number of phases in the motor. Each device comprises a cathode, a control electrode and an anode. The cathode may be common to all of said devices when a multi-discharge path tube is used as shown. Each device is numbered from 1 to 6. The control electrode inputs are separate and the respective terminals are numbered from 51 to 56. The anode or plate outputs are also separated and numbered from 11 to 16. Each device may consists as shown of an ionic discharge path or a vacuum discharge path, though semiconductor devices such as transistors may also be substituted for such arrangements.

Part (B) includes the motor to be fed. Said motor is merely shown by its armature disc-shaped member 37 and the winding thereof is not shown in FIG. 1, except by the circle 37 and the input terminals thereof from 31 to 36. This armature is mounted on a fixed carrier, as it will be hereinbelow defined but the inductor part of the motor, not shown in FIG. 1, is mounted on a shaft represented by line 20. The supply circuits for said motor armature are connected to the anode outputs of the part (A) and, in FIG. 1, they comprise three voltage dividers 7, 8 and 9 and three transformers 17, 18 and 19 respectively connected across the voltage dividers 9, 8 and 7. The secondary windings of said transformers have their mid-points connected to a biasing voltage, usually the ground. The voltage dividers are, through mid-taps, connected to the positive pole +V of a battery or other D.C. source not shown. The cathodes of the devices in part (A) are connected to a point —V of such a battery for instance. The anodes of the devices in part (A) are connected to +V through taps of the said voltage dividers which are equidistant on each side of the mid-points on said voltage dividers: the anodes of 1 and 4 are thus connected to the voltage divider 7, the anodes of 3 and 6 are so connected to the voltage divider 8 and the anodes of 5 and 2 are so connected to the voltage divider 9.

A control voltage issuing from terminal 41 of the tachometer winding must ensure the feeding of terminal 31 of the motor winding, through the operation of control electrode unidirectional discharge device 1. The control signal from 41 is transmitted through transformer 27 to the control electrode of 1; since a transformer introduces a 180° phase-shift, the said control electrode is connected to output 51 of transformer 27, reverse with respect to the input of the primary winding of said transformer to which is connected terminal 41; then, anode output 11 of the control member 1 is connected to one end of the primary winding of transformer 19; since this transformer introduces a further 180° phase-shift, it is the upper terminal 21 of the secondary winding thereof which is connected to supply terminal 31 of the motor winding, whereas the input from 11 reaches the lower input terminal of the primary winding of transformer 19. The same remarks apply for the other connections between any terminal of the tachometer generator winding up to the supply terminal of the motor winding; the corresponding shifts of connections are provided at the respective transformers 28, 29 and 17, 18.

Part (C) comprises the tachometer generator, merely shown in FIG. 1 by the circle 47 representing armature thereof with its output taps 41 to 46 of the winding which is not otherwise shown, and the shaft 20 of its inductor not otherwise shown, together with the circuits connecting said terminals 41 to 46 to the control electrodes of the unidirectionally conducting devices of part (A). Said circuits include three transformers 27, 28 and 29, each of which has a secondary mid-point connected to a bias voltage v. Transformer 27 is fed from the terminals 41 and 44, transformer 28 from 43 and 46, and transformer 29 from 42 and 45. The numbering takes into account the 180° phase-shift between inputs and outputs of the transformers.

The operation of the system may be explained as follows:

As soon as the motor is started, in any conventional fashion, the tachometer winding generates and delivers hexaphased voltages to the control electrodes of the devices 1 to 6 which are thus sequentially and cyclically activated and, responsive thereto, supply the motor armature with a set of six phase alternating of a frequency proportional to the instantaneous speed of rotation of the shaft 20. Such process continues up to the synchronous speed of the system at which the motor is controlled by the automatic piloting or regulation of the unidirectionally conducting devices responsive to the tachometer voltages. From this point, the said motor operates as a synchronous machine with maximum torque. The efficiency is optimum and no risk of oscillation or loss of synchronism may occur since the supply frequency of the control grids of the devices 1 to 6 is at any time isochronous to the speed of rotation proper of the motor. The system is self-synchronizing and the speed of rotation may be varied by merely varying the value of bias voltage v since, for such a change of bias the R.M.S. value of the current fed to each anode will proportionally vary.

When the motor winding is star-connected, as shown in FIG. 2, the arrangement may be simplified in that the transformers 17, 18 and 19 of FIG. 1 may be omitted as also are the voltage dividers 7, 8 and 9. The common point of the star-connected winding is connected to +V through a mere resistor 30 and the anode terminals 11 to 16 are directly connected to the input taps 31 to 36 of the motor winding.

When, similarly, the tachometer winding is star-connected, FIG. 3, the arrangement may be simplified in that the output terminals 41 to 46 from said winding may be connected to the input terminals 51 to 56 of the control electrodes of the unidirectionally conducting devices 1 to 6, the mid-point of the star connection being connected through a mere resistor 40 to the biasing voltage v.

As above stated such a system may advantageously have recourse to axial airgap machines and specially to such machines which includes printed-circuit windings. For avoiding the use of a commutator and brushes, the inductor parts of the motor and tachometer generator are the rotating ones, and the armature windings are the fixed members in such machines. Further, it is of advantage to then combine the motor and tachometer generator in a single electro-mechanical unit. This is made practically feasible with such printed-circuit windings as the thickness thereof is quite small. Two such windings may be applied against each other, with the insertion of a thin dielectric layer therebetween, without lending to a prohibitively large airgap. Such a combined machine is shown in FIG. 4 with such a double armature winding arrangement.

In said FIG. 4, the disc-shaped winding of the motor is shown at 37 and the disc-shaped winding of the tachometer is shown at 47. Said members are applied against one another with the interposition of a thin insulating sheet 39. The composite member thus obtained is clamped at its outer edge between rings 38 and 48 spaced by a further ring-shaped member 40. The inductor is made of two rings of magnetic poles 49 and 50, made for instance of permanent magnets affixed to annular yoke plates 57 and 58 affixed to a sleeve 59. The rotor inductor part of the machine will be secured to the shaft 20 (not shown in FIG. 4 but see FIG. 10) and the stator or fixed armature is secured to a housing not shown. Instead of utilising separate magnets for the poles, a single ring of magnetic coercive material such as coercive ferrite may be used with magnetic poles impressed therearound through a conventional magnetization process, or else, U-shaped magnets may be used for constituting the two rings of magnetic poles, provided the central aperture in the winding member enables such U-shaped magnets to be brought to their side to side position for constituting a double ring on one side of which a mechanical carrier may be provided. In another alternative embodiment, a single ring of magnetic poles may be used, and the magnetic pole rings on the other side of the stator may be replaced by a mere magnetic yoke ring.

The motor and tachometer windings may be separately mounted, as shown in FIG. 10. Said windings 37 and 47 are then each applied to a magnetic annular member, 137 for the winding 37 and 147 for the winding 47. Such members may be made of non-coercive or soft magnetic material or of a spiralled magnetic tape, and their purpose is to ensure a path for closing the magnetic flux from the rotating inductor structure 100 which is in the shape of a disc and is mounted between the two stator windings. Preferably in such a case and as shown, the inductor disc is a coercive ferrite one with magnetic poles impressed thereon.

In both structures of FIGS. 4 and 10, the winding taps are preferably made integral with the winding conductors and will be connected to terminals, not shown, on the rings carrying the windings.

Figure 5:
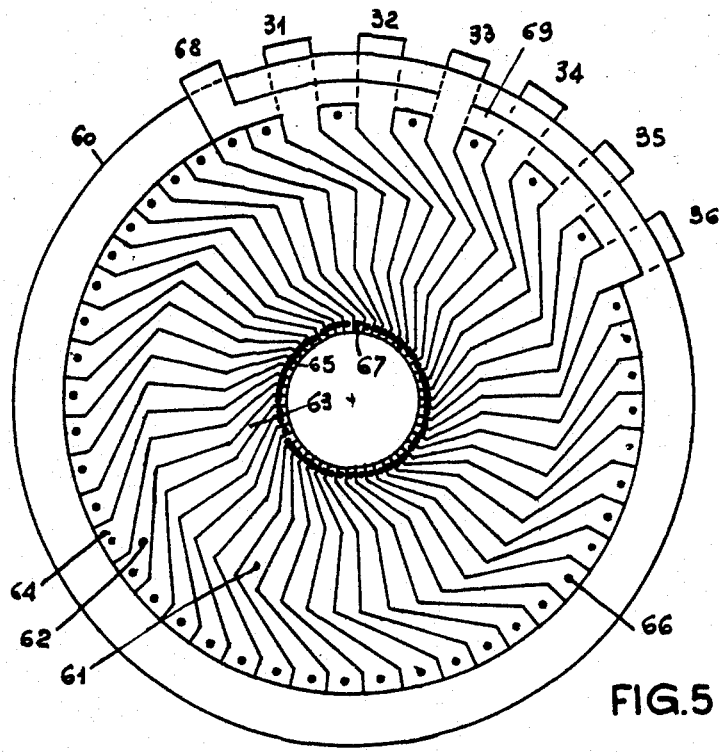
FIG. 5 shows a view of one side of the printed-circuit winding of the motor part of the machine of FIG. 4, having eight poles and star-connected in a three-hexa-phase arrangement.
Figure 6:
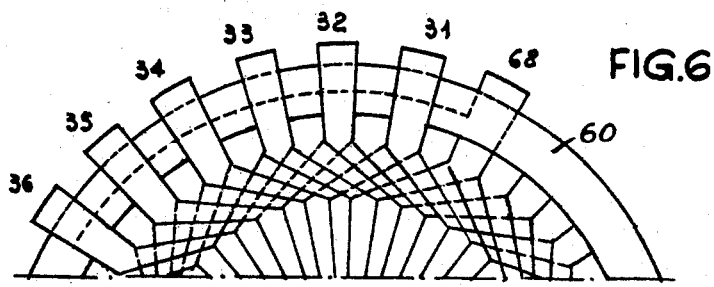
FIG. 6 is a partial view of the other side of said winding.

The motor winding may be either of the series-wave kind of the mesh or lap-wound kind. Preferably, it will be provided of the series-wave kind in order to avoid undue multiplicity of the taps. Illustratively, such a printed-circuit winding is shown in FIGS. 5 and 6 in an example comprising forty-nine turns for an eight magnetic pole machine. The number of poles is apparently not related to the number of phases in the winding. The winding example shown has two turns per phase and pole pitch. Broadly speaking and as previously disclosed by applicant, in Ser. No. 1,128, filed January 7, 1960, such a winding comprises two sets of conductors, one set per face, representing half-turns on the opposite faces of an insulating carrier disc 60. Each half-turn conductor is of identical shape and dimension, comprising an intermediary part 61 which is substantially of radial orientation and sectorally shaped, extended at its two ends by inclined portions 62 and 63 up to end terminal areas 64 on the outer edge and 65 on the inner edge of the disc-shaped carrier. The slants of said inclined portions are so provided as to determine the inner and outer pitches of the winding pattern as obtained by face-to-face connections between the said end areas 64 and 65 on one face and corresponding areas on the other face. The winding half patterns are the same on each face but when applied to the carrier and seen from one side, the inclined portions are of reversed directions of slanting. The direction of slanting of said inclined portions, on each face, is the same for a series-wave pattern. The directions of such inner and outer inclined portions will be reversed when a lap-wound pattern is used. The face-to-face connections are marked by dots such as 66 and 67 in FIG. 5.

If all such face-to-face connections were made, the winding pattern would be a polygonal one whatever the number of phases to be provided and the input/output taps would be provided by extensions of conductors spaced apart by 30 electrical degrees around the annular member. Such arrangement may be easily seen by omitting the tap 68 and the segment 69 in FIG. 5 and marking dots for all the conductor ends. However, as it is preferable, as said, to ensure a star-connection of the phases in the winding, no face-to-face connection has been provided in registration with the extending terminals 31 to 36 and, on the other hand, the extending terminal 68 and segmental conductor 69 have been actually provided in the printed circuit member. Conductor 69 is an extension of those of the half-turn conductors facing those on the other face to which are appended the terminals 31 to 36, all on one face of the member. Forming such a winding is simple in printed circuitry technique—over an insulating annular carrier 60 two conducting sheets are glued, with the outer edges of said sheets extending beyond the outer edge of the carrier, and the holes are bored in such a sandwich at the required places for the face-to-face connections. Thereafter a photo-etching process is applied as usual so that the conductor and terminal patterns are obtained. Thereafter, the holes are metallized in a conventional fashion for ensuring the face-to-face connections.

If a lap-wound winding is to be formed, twice as many sets of terminals as pitches in the winding would be necessary, and in the sets of terminals, common connections to supply terminals would have to be made.

The tachometer winding may be similar to that of the motor but however, the pattern may be advantageously simplified when it is considered that, for the control of the devices 1 to 6, this action is repeated from revolution to revolution of the motor and consequently, it is not necessary to distribute the tachometer winding over the whole circumference of the member. The tachometer winding may cover only a single double polar pitch on the disc, with the whole of the phases arranged within such an angular area. It is more advantageous to provide a distribution of the coils of the tachometer winding over different areas each covering a double polar pitch, in order to avoid imbrication or overlapping of the coils of the phases in said tachometer winding.

FIGS. 7 and 8 respectively show the two faces of the upper half of a tachometer winding unit. In the unshown half of the unit there is no winding at all. The winding is made two-face but this is not imperative in such a case. In the arrangement of FIGS. 7 and 8 the three winding spools formed of double coils 71–81, 72–82 and 73–83 are completely separate. Each spool however presents a mid-point at the through-connection from one face to the other one, as shown at 74, 75 and 76 respectively for the three spools. Each double-coil spool has a coverage equal to one polar pitch of the disc-shaped member, viz. the angular coverage between the radial axis of a north pole and a south pole in the circumference. The radial axes of the spools are spaced apart by 60 electrical degrees since in a three-hexa-phase system, three voltages are in relative phase opposition with the three other ones. The terminal extensions 41–44 on opposite faces of disc 44 are superimposed but not connected, so are the terminal extensions 43–46 and 45–42. Of course, each spool will, in actual practice, comprise more conductors than are shown in the drawing.

When a star-connection pattern is required, in case of the omission of the transformers as in FIG. 3, a conducting segment 79 is applied as shown in FIG. 9 over one face of the winding (such as the FIG. 7 face) with the insertion of a thin dielectric or insulating sheet between said conductor 79 and said face of the winding pattern, and through connections such as are shown at 78 are established between the mid-points 74, 75 and 76 of the spools or coils of the winding and the conductor 79. An extension 80 on segment 79 constitutes a terminal for the application of the bias voltage to said tachometer winding.

Such a kind of tachometer winding presents a further advantage: when required, the waveform of the generated currents may be obtained by a suitable distribution of the widths of the radial parts of the spools as for instance disclosed in the co-pending application Serial No. 3,769, filed January 21, 1960.

What is claimed is:

1. A rotary electric machine comprising a magnetic field member mounted for rotation about a rotary axis and producing magnetic fields of opposite polarity in spaced polar areas, such fields rotating in an annular path surrounding said axis, a stationary armature member having mounted thereon an annular armature winding distributed entirely about the rotary axis of said field member and located within the annular path of rotation of said magnetic fields, said armature winding being formed of a plurality of sections spaced angularly about said axis and constituting winding sections having spaced relative phases, a control winding mounted in fixed relation with said armature winding and in a position to have voltages induced therein by said rotary fields, a plurality of taps on said control winding for deriving from said control winding a plurality of phase voltages of different phase relations and corresponding in number to the number of phase sections in said armature winding, a plurality of voltage-responsive current-control devices, one for each phase section in said armature winding, each current-control device including an input circuit and an output circuit, supply terminals for direct current, individual connections completing the output circuit of each control device from one supply terminal to the other through separate phase sections of said armature winding, and individual connections supplying the respective phase control voltages from said control winding to the input circuits of said current-control devices.

2. A machine according to claim 1, wherein said field and armature members form an axial airgap and said armature and control windings are printed-circuit windings formed on thin annular carriers, said carriers being supported at their outer edges and forming a balanced arrangement of magnetic forces with respect to said rotary field member.

3. A machine according to claim 2, wherein said printed-circuit windings are applied one against another with the interposition of thin insulation therebetween, said rotary field member being formed in two members located on opposite sides of said dual winding arrangement, said field members being secured to a common output shaft of the machine.

4. A machine according to claim 1, wherein said armature and control windings are spaced apart and cooperate with a single rotating magnet field member rotating between them.

5. A machine according to claim 4, wherein each of said windings is affixed to a magnetic ring yoke on the side thereof facing said rotary field member.

6. A machine according to claim 1, wherein said current-control devices comprise unidirectionally conducting devices, each including a cathode, a control electrode and an anode, and transformers inserted between the anodes of the said devices and the input current terminals of said armature winding.

7. A machine according to claim 6 wherein the armature winding is of a star-connected pattern having a common phase point connected to a source of anode current, the anodes of said devices being connected to said input terminals of the armature winding.

8. A machine according to claim 1, said current-control devices comprise unidirectionally conducting devices, each including a cathode, a control electrode and an anode, and transformers connecting the output terminals of the control winding to the control electrodes of said devices.

9. A machine according to claim 1 wherein said current-control devices comprise unidirectionally conducting devices, each including a cathode, a control electrode and an anode, and the control winding is of a star-connected type and the phase output terminals thereof are connected to said control electrodes, and a source of biasing voltage connected to the common point of said star-connected control winding.

10. A machine according to claim 2, wherein said armature winding is of a pattern covering the complete area of the annular faces of its annular carrier.

11. A rotary machine according to claim 1 wherein said current-control devices comprise unidirectional conducting devices, each including a cathode, a control electrode and an anode, and a source of voltage connected to the control electrodes of said devices to variably bias said devices for operation over different anode current ranges.

References Cited by the Examiner
UNITED STATES PATENTS

| | | | |
|---|---|---|---|
| 2,254,714 | 9/41 | Stohr | 318—138 X |
| 2,719,944 | 10/55 | Brailsford | 318—254 |
| 2,866,144 | 12/58 | Kern | 318—138 |
| 2,980,839 | 4/61 | Haeussermann | 318—138 |
| 2,993,159 | 7/61 | Devil | 318—254 |

JOHN F. COUCH, *Primary Examiner.*

ORIS L. RADER, *Examiner.*